United States Patent
Wang et al.

(10) Patent No.: US 6,931,260 B2
(45) Date of Patent: Aug. 16, 2005

(54) MOBILE COMMUNICATION TERMINAL APPARATUS

(75) Inventors: Wan Wang, Sagamihara (JP); Akira Ishikura, Kawasaki (JP); Moriaki Kiyomoto, Kokubunji (JP); Takashi Sakagawa, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 487 days.

(21) Appl. No.: 10/268,909

(22) Filed: Oct. 11, 2002

(65) Prior Publication Data

US 2003/0073457 A1 Apr. 17, 2003

(30) Foreign Application Priority Data

Oct. 12, 2001 (JP) ....................................... 2001-315814

(51) Int. Cl.$^7$ ................................................. H04B 1/38
(52) U.S. Cl. .................. 455/552.1; 455/435.3
(58) Field of Search .......................... 455/552.1, 553.1, 455/435.2, 435.3

(56) References Cited

U.S. PATENT DOCUMENTS

| | | | | |
|---|---|---|---|---|
| 5,940,770 A | * | 8/1999 | Kuki | 455/510 |
| 5,995,829 A | * | 11/1999 | Broderick | 455/418 |
| 6,011,978 A | * | 1/2000 | Ault et al. | 455/552.1 |
| 6,058,316 A | * | 5/2000 | Takahashi | 455/552.1 |
| 6,181,952 B1 | * | 1/2001 | Murata | 455/552.1 |
| 6,408,020 B1 | * | 6/2002 | Kaji et al. | 375/216 |
| 6,625,451 B1 | * | 9/2003 | La Medica et al. | 455/434 |

* cited by examiner

Primary Examiner—Quochien B. Vuong
Assistant Examiner—Christian Hannon
(74) Attorney, Agent, or Firm—Banner & Witcoff, Ltd.

(57) ABSTRACT

A system selection mode resetting function is newly added as a system selection mode to a mobile communication terminal apparatus having a plurality of system selection modes assigned different priorities. A system selection mode setting unit checks a system selection mode stored in the first memory in response to power-off or subsequent power-on. If the determination result reveals the presence of another mode higher in priority than the mode stored in the first memory, the mode stored in the first memory is reset to the higher-priority mode.

6 Claims, 8 Drawing Sheets

Change of mode stored in first memory

| Original setting mode | Mode after mode change operation | | Mode after power-on |
|---|---|---|---|
| Automatic mode | Analog only mode | Execution of power-off/on | Automatic mode |
| | Home only mode | | Home only mode |
| Analog only mode | Automatic mode | | Automatic mode |
| | Home only mode | | Home only mode |
| Home only mode | Analog only mode | | Home only mode |
| | Automatic mode | | Automatic mode |

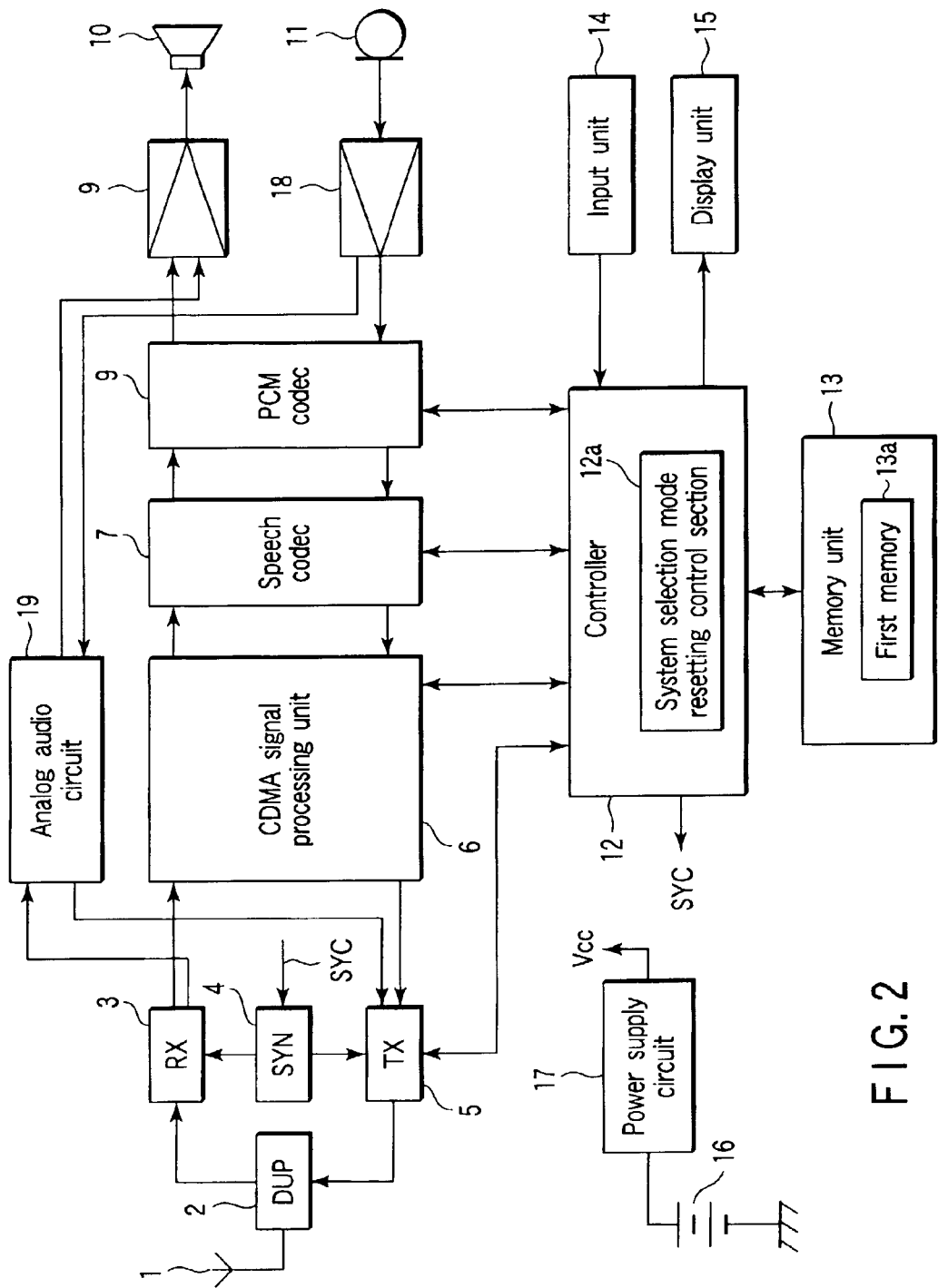
F I G. 2

Change of mode stored in first memory

| Original setting mode | Mode after mode change operation | | Mode after power-on |
|---|---|---|---|
| Automatic mode | Analog only mode | Execution of power-off/on | Automatic mode |
| Analog only mode | Automatic mode | | Automatic mode |

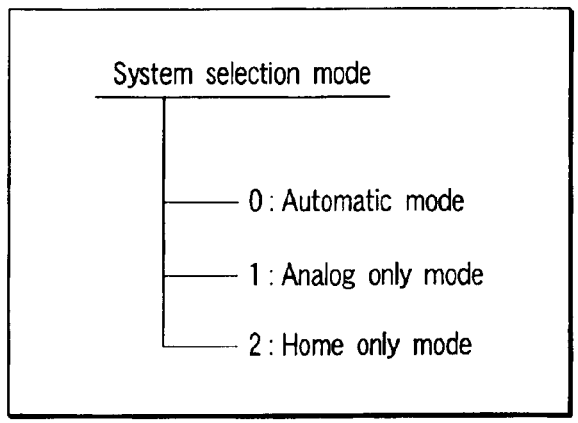

```
System selection mode
    ├── 0 : Automatic mode
    ├── 1 : Analog only mode
    └── 2 : Home only mode
```

FIG. 9

Change of mode stored in first memory

| Original setting mode | Mode after mode change operation | | Mode after power-on |
|---|---|---|---|
| Automatic mode | Analog only mode | Execution of power-off/on | Automatic mode |
| | Home only mode | | Home only mode |
| Analog only mode | Automatic mode | | Automatic mode |
| | Home only mode | | Home only mode |
| Home only mode | Analog only mode | | Home only mode |
| | Automatic mode | | Automatic mode |

FIG. 10

MOBILE COMMUNICATION TERMINAL APPARATUS

CROSS-REFERENCE TO RELATED APPLICATIONS

This application is based upon and claims the benefit of priority from the prior Japanese Patent Application No. 2001-315814, filed Oct. 12, 2001, the entire contents of which are incorporated herein by reference.

BACKGROUND OF THE INVENTION

1. Field of the Invention

The present invention relates to a multimode type mobile communication terminal apparatus used in an area where a plurality of systems provide services.

2. Description of the Related Art

For example, North America has an area where an analog system (AMPS: Advanced Mobile Phone System) and a plurality of digital systems (PCS: Personal Communication System and CDMA: Code Division Multiple Access system) provide services. As a mobile communication terminal apparatus used in such an area, a multimode type mobile communication terminal apparatus capable of accessing any of these systems has been developed.

As a control mode for selecting a system, the multimode type mobile communication terminal apparatus is equipped with an automatic system selection mode (to be referred to as an automatic mode hereinafter) and an analog only mode.

In the automatic mode, the mobile communication terminal apparatus sequentially searches control signals transmitted by respective systems from their base stations upon power-on of the mobile communication terminal apparatus. If the mobile communication terminal apparatus detects by this search a control signal which satisfies a predetermined condition, the apparatus acquires the base station which has transmitted the control signal, and shifts to the standby state.

At this time, search priority is set in advance for the digital and analog systems. For example, the digital system is assigned a higher priority than the analog system. In this case, the mobile communication terminal apparatus searches for a control signal transmitted by the base station of a digital system. If the apparatus does not detect by this search any digital system which satisfies a condition, the apparatus then searches for a control signal transmitted by the base station of an analog system. If the apparatus detects a control signal which satisfies the condition, the apparatus acquires the base station of the analog system which has transmitted the control signal, and shifts to the standby state.

In the analog only mode, the mobile communication terminal apparatus searches control signals transmitted by the base stations of a plurality of systems for only a control signal transmitted by an analog system. If the apparatus detects a control signal which satisfies a condition, the apparatus acquires the base station which has transmitted the control signal, and shifts to the standby state.

The power consumption in speech communication is generally higher in the analog system than in the digital system. In the multimode type mobile communication terminal apparatus, the automatic mode has a higher priority than the analog only mode, and a system is selected in the automatic mode in a normal state. Depending on the location of the terminal apparatus, only weak radio waves may be received from the base station of a digital system. Leaving this state to stand unpreferably decreases the connection completion ratio. In this case, the user changes the system selection mode to the analog only mode. This operation changes the system selection mode of the terminal apparatus to the analog only mode, and an analog system is acquired in accordance with the analog only mode. After that, the terminal apparatus can perform stable standby operation between the apparatus and an analog system where the reception field is relatively strong.

The conventional terminal apparatus however suffers the following problems. If the system selection mode of the terminal apparatus is once changed to the analog only mode, this state is held even upon power-off of the terminal apparatus unless the user performs mode change operation again. For example, the user temporarily turns off the terminal apparatus when getting on a train or airplane, and turns on the terminal apparatus after getting off the train or airplane. In this case, the terminal apparatus executes system selection operation in the analog only mode, and as a result, acquires an analog system. If the user keeps using the terminal apparatus in this state without being aware of it, a larger amount of power than in the digital system is consumed. The battery runs out faster than expected, and the terminal apparatus cannot be used.

BRIEF SUMMARY OF THE INVENTION

It is the main object of the present invention to provide a mobile communication terminal apparatus capable of automatically resetting the system selection mode to a higher-priority mode even when the user changes the system selection mode, always using an optimal system selection mode, and improving the operability.

To achieve the above object, according to an aspect of the present invention, there is provided a mobile communication terminal apparatus which can be selectively connected to a plurality of mobile communication systems and has a plurality of system selection modes assigned priorities in advance, comprising a first memory configured to store one of the plurality of system selection modes, first mode change means for, when a user of the apparatus performs system selection mode change operation in a standby state, changing the mode stored in the first memory to a system selection mode selected by the change operation, first control means for executing processing of changing a mobile communication system at a connection destination in accordance with the system selection mode changed by the first mode change means, determination means for determining a priority assigned to the system selection mode stored in the first memory in response to power-on, second mode change means for changing the system selection mode stored in the first memory to a system selection mode higher in priority than the mode on the basis of a determination result of the determination means, and second control means for acquiring the mobile communication system at the connection destination in accordance with the system selection mode changed by the second mode change means in response to power-on, and shifting to the standby state.

The gist of the present invention is to automatically reset the mode in the first memory used to store a system selection mode in use to a higher-priority mode by the system selection mode setting means in response to power-off or subsequent power-on.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a functional block diagram showing the arrangement of a mobile communication terminal apparatus according to the first embodiment of the present invention;

FIG. 9 is a view showing the structure of the system selection menu of the mobile communication terminal apparatus according to the second embodiment of the present invention; and FIG. 10 is a table showing the transition state of a system selection mode in the first memory of the mobile communication terminal apparatus shown in FIG. 2.

DETAILED DESCRIPTION OF THE INVENTION (First Embodiment)

The first embodiment of a mobile communication terminal apparatus according to the present invention newly adds a system selection mode resetting function to a mobile communication terminal apparatus having an automatic mode (automatic system selection mode) and an analog only mode lower in priority than the automatic mode. The system selection mode stored in the first memory is checked in response to power-on prior to the start of system selection control. If the system selection mode stored in the first memory is the analog only mode as a result of determination, the mode stored in the first memory is reset to the higher-priority automatic mode.

Figure 1:
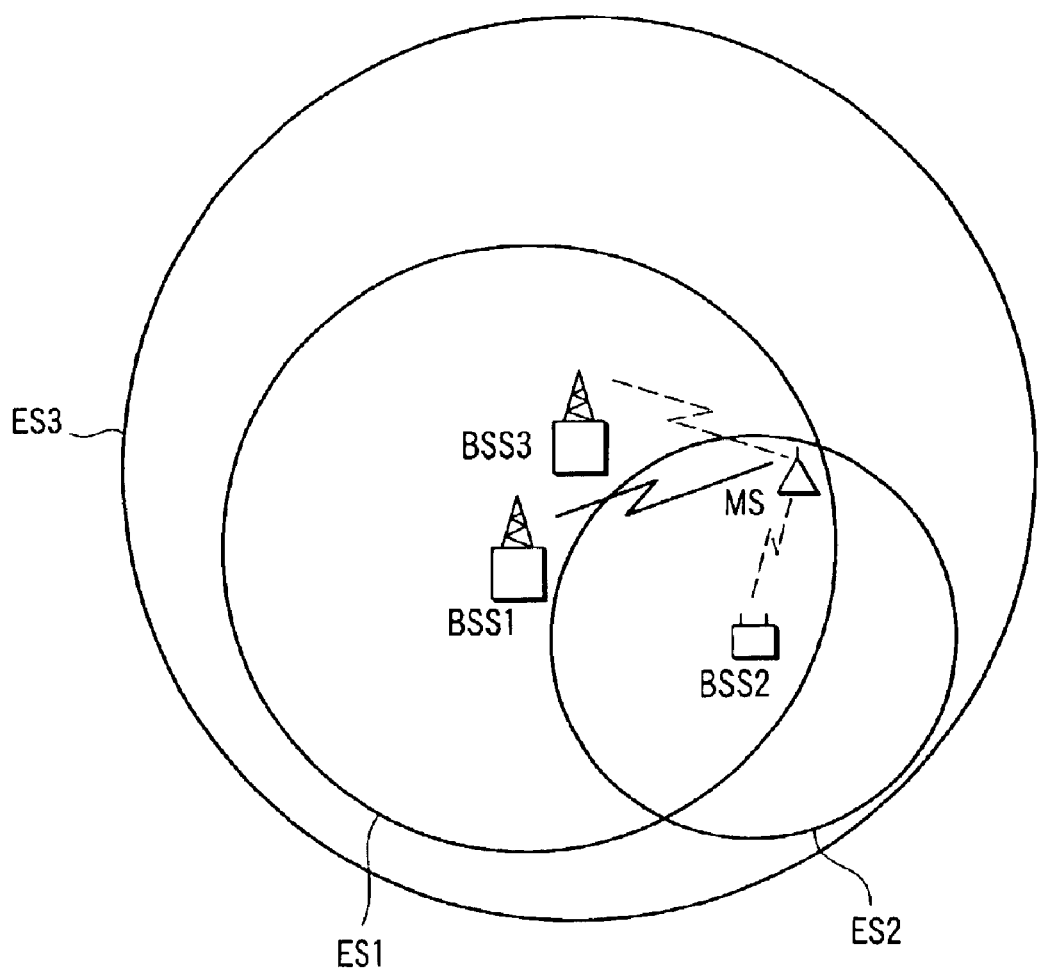
FIG. 1 is a schematic view showing the state of a service area where a mobile communication terminal apparatus according to the present invention is used.

FIG. 1 is a schematic view showing the state of a service area where a mobile communication terminal apparatus according to the first embodiment is used. In this service areas, a plurality of systems operated independently (three systems are shown in FIG. 1) form radio areas ES1, ES2, and ES3. Base stations BSS1, BSS2, and BSS3 are installed in the radio areas ES1, ES2, and ES3, respectively. The base stations BSS1, BSS2, and BSS3 are connected to mobile communication switching apparatuses (not shown) operated by the respective systems.

Examples of the systems are a CDMA (Code Division Multiple Access) digital portable communication system, a CDMA personal mobile communication system called a PCS (Personal Communication System), and an analog portable telephone system of analog communication type such as an AMPS (Advanced Mobile Phone System).

For descriptive convenience, FIG. 1 shows the radio areas ES1, ES2, and ES3 of the respective systems. In practice, a plurality of base stations are distributed and arranged for each system, and their base stations form a plurality of radio areas. The radio areas are called cells or sectors.

FIG. 2 is a functional block diagram showing the arrangement of the mobile communication terminal apparatus according to the first embodiment. The mobile communication terminal apparatus is a multimode type terminal capable of communicating by selectively using, e.g., a CDMA digital mode and AMPS analog mode.

Radio carrier signals transmitted by the base stations BSS1, BSS2, and BSS3 are received by an antenna 1 and input to a reception circuit (RX) 3 via an antenna duplexer 2 (DUP). The reception circuit 3 mixes the radio carrier signal with a reception local oscillation signal output from a frequency synthesizer (SYN) 4, and down-converts the resultant signal into an intermediate frequency signal or baseband signal. The frequency of the reception local oscillation signal generated by the frequency synthesizer 4 is designated by a control signal SYC from a controller 12.

The received intermediate frequency signal or received baseband signal is input to a CDMA signal processing unit 6 when the digital mode is set as a communication mode, or to an analog audio circuit 19 when the analog mode is set.

The CDMA signal processing unit 6 performs, to the input received intermediate frequency signal or received baseband signal, orthogonal demodulation processing and despreading processing using a spreading code (PN code) assigned to a reception channel, thereby obtaining demodulated data of a predetermined format corresponding to the data rate. The demodulated data is input to a speech codec 7. Of the demodulated data, control data representing the data rate is input as a reception data rate to the controller 12.

The speech codec 7 performs, to the demodulated data output from the CDMA signal processing unit 6, decompression processing corresponding to the reception data rate designated from the controller 12. Then, the speech codec 7 executes decoding processing and error correction decoding processing using Viterbi decoding or the like, and reconstructs received digital data of the baseband.

A PCM codec 8 executes different signal processing in accordance with the communication type (speech communication or data communication) of the digital speech signal output from the controller 12. In speech communication, the PCM codec 8 PCM-decodes the received digital data output from the speech codec 7, and outputs an analog reception signal. The analog reception signal is amplified by a reception amplifier 9 and output from a loudspeaker 10. In data communication, the PCM codec 8 supplies the received digital data output from the speech codec 7 to the controller 12. The controller 12 stores the received digital data in a memory unit 13 and displays the data on a display unit 15. If necessary, the PCM codec 8 outputs the received digital data from an external interface to a portable information terminal (PDA: Personal Digital Assistance) (not shown) or to a personal computer such as a notebook model personal computer.

The analog audio circuit 19 analog-demodulates the input received intermediate frequency signal by an FM detector or the like, reproducing an analog reception signal. The analog reception signal is amplified by the reception amplifier 9 and output from the loudspeaker 10.

The input speech of the speaker in speech communication is input as an analog transmission signal via a microphone 11, and amplified to a proper level by a transmission amplifier 18. The amplified speech is input to the PCM codec 8 when the digital mode is set as a communication mode, or to the analog audio circuit 19 when the analog mode is set.

The PCM codec 8 performs PCM coding processing to the input analog transmission signal. The generated transmission data is supplied to the speech codec 7. Data output from a personal computer (not shown) is input to the controller 12 via an external interface, and input from the controller 12 to the speech codec 7 via the PCM codec 8.

In speech communication, the speech codec 7 detects the energy amount of input speech in transmission speech data output from the PCM codec 8, and determines a data rate based on the detection result. The speech codec 7 compresses the transmission data to a burst signal of a format corresponding to the data rate, performs error correction coding processing, and outputs the data to the CDMA signal processing unit 6. In data communication, the speech codec 7 compresses transmission data output from the PCM codec 8 into a burst signal of a format corresponding to a preset data rate, performs error correction coding processing, and outputs the data to the CDMA signal processing unit 6. The data rate of either speech communication or data communication is notified the controller 12 as a transmission data rate.

The CDMA signal processing unit 6 executes, to the burst signal compressed by the speech codec 7, spreading processing using a PN code assigned to a transmission channel. The CDMA signal processing unit 6 performs orthogonal modulation processing to the spread transmission signal, and outputs the orthogonal-modulated signal to a transmission circuit (TX) 5.

The analog audio circuit 19 modulates a carrier wave signal out of an input analog transmission signal by using analog modulation such as FM modulation, and outputs the modulated carrier wave signal to the transmission circuit (TX) 5.

The transmission circuit 5 synthesizes the input orthogonal-modulated signal or carrier wave signal and a transmission local oscillation signal generated by the frequency synthesizer 4, and up-converts the synthesized signal into a radio carrier signal. The transmission circuit 5 RF-amplifies only the effective part of the radio frequency signal on the basis of a transmission data rate designated by the controller 12, and outputs the resultant signal as a transmission radio carrier signal. The transmission radio carrier signal output from the transmission circuit 5 is supplied to the antenna 1 via the antenna duplexer 2, and burst-transmitted from the antenna 1 to a base station (not shown).

An input unit 14 comprises keys such as a dial key, origination key, power key, end key, volume control key, and mode designation key. The display unit 15 comprises an LCD display and LED. The LCD display displays memory information of a telephone directory, the origination/termination log, the telephone number of the terminal apparatus of a partner, and the operation state of the user's apparatus. The LED displays information about the discharge state of a battery 16, i.e., request to charge the battery 16.

Reference numeral 17 denotes a power supply circuit which generates a predetermined operation power supply voltage Vcc based on an output from the battery 16 and supplies the voltage to each circuit. The power supply circuit 17 has a charging circuit which charges the battery 16.

The controller 12 comprises, e.g., a microcomputer as a main controller. The controller 12 has a communication control function of executing radio connection control in accordance with origination/termination and enabling speech communication and data communication, a position registration control function, an idle handoff control function, and in addition a system selection mode resetting control section 12a as a new control function concerning the system selection function of the present invention.

When the terminal apparatus is powered on/off, the system selection mode resetting control section 12a checks, prior to the start of system selection control, whether the mode stored in a first memory 13a is the analog only mode or automatic mode. The first memory 13a is incorporated in the memory unit 13 and used to store a system selection mode in use. The first memory 13a can also be incorporated in the internal memory of the controller 12.

If the mode stored in the first memory 13a is the automatic mode as a result of determination, the controller 12 keeps holding the mode stored in the first memory 13a. If the mode stored in the first memory 13a is the analog only mode, the controller 12 rewrites the mode stored in the first memory 13a to the automatic mode.

Figure 3:
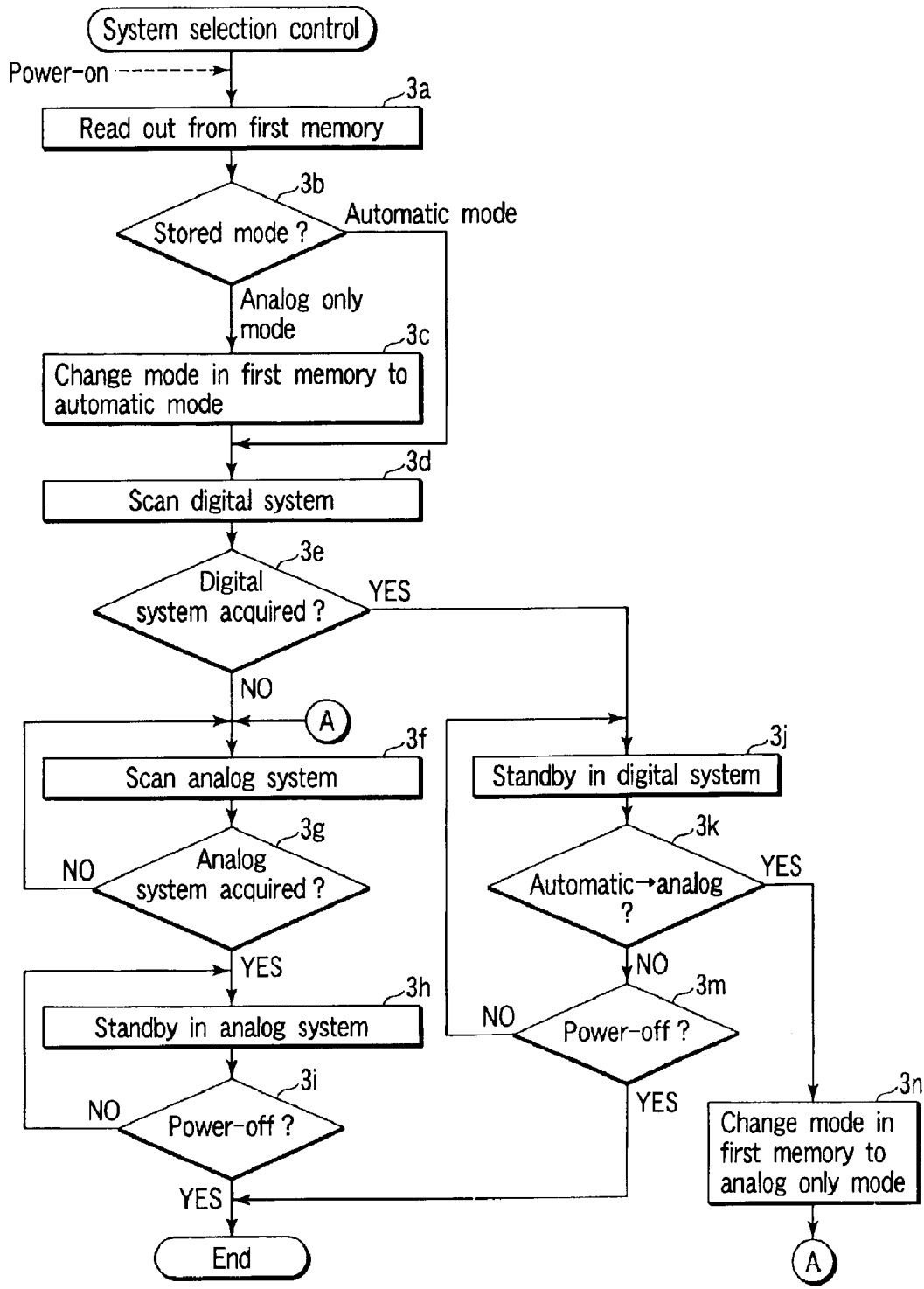
FIG. 3 is a flow chart showing the control procedures and control contents of system selection control executed in the mobile communication terminal apparatus shown in FIG. 2.

System selection control operation by the terminal apparatus having the above arrangement will be explained. FIG. 3 is a flow chart showing the control procedures and control contents.

In shipping the terminal apparatus, the higher-priority automatic mode is set in the first memory 13a. If the user powers on the terminal apparatus in this state, the controller 12 reads out the mode stored in the first memory 13a in step 3a, and checks in step 3b whether the stored mode is the automatic mode or analog only mode. By default, the automatic mode is stored in the first memory 13a. Thus, the controller 12 does not change the automatic mode stored in the first memory 13a. The controller 12 starts system selection control processing as follows in accordance with the stored automatic mode.

More specifically, in step 3d, the controller 12 scans pilot signals broadcast by the base stations of digital systems in order of priority, and determines their reception qualities. If the controller 12 detects a pilot signal which satisfies a condition as a result of scanning, the controller 12 shifts from step 3e to step 3j. The controller 12 establishes synchronization with the base station of the digital system which has transmitted the pilot signal, and shifts to the standby state.

If the controller 12 cannot acquire the base station of any digital system, the controller 12 shifts from step 3e to step 3f, and searches control signals broadcast by analog systems. If the controller 12 receives a control signal which satisfies the condition, the controller 12 shifts from step 3g to step 3h. The controller 12 acquires the base station of the analog system, and shifts to the standby state.

During standby operation for the base station of the analog system, the controller 12 monitors power-off in step 3i while monitoring an originating/terminating call or checking the necessity of handoff. If the user powers off the terminal apparatus, the controller 12 ends the control and shifts to the operation stop state.

During standby operation for the base station of the digital system, the controller 12 monitors system selection mode change operation by the user in step 3k while monitoring an originating/terminating call or checking the necessity of handoff. At the same time, the controller 12 monitors power-off in step 3m. If the user powers off the terminal apparatus, the controller 12 ends system selection control and shifts to the operation stop state, similar to the case wherein the terminal apparatus is connected to the analog system.

Assume that the user desires connection to, e.g., an analog system and performs operation of changing the system selection mode from the automatic mode to the analog only mode. This change operation is done by invoking, e.g., a system selection menu shown in FIG. 4, and selecting and designating "1" corresponding to the analog only mode in the menu.

If the analog only mode is selected, the controller 12 rewrites the automatic mode stored in the first memory to the analog only mode in step 3n. The controller 12 shifts to step 3f to execute a series of procedures of searching control signals transmitted by the base stations of analog systems. If the controller 12 detects a control signal which satisfies a condition, the controller 12 acquires the base station of the analog system which has transmitted the control signal, and shifts to the standby state. This state is canceled after power-off.

If the system selection control is changed to the analog only mode, the mode stored in the first memory is reset as follows.

Figures 4, 5:
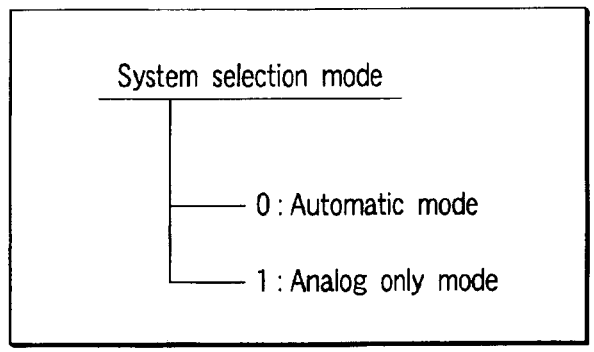
FIG. 4 is a view showing the structure of the system selection menu of the mobile communication terminal apparatus shown in FIG. 2.
FIG. 5 is a table showing the transition state of a system selection mode in the first memory of the mobile communication terminal apparatus shown in FIG. 2.

More specifically, if the terminal apparatus is powered on, the controller 12 reads out the mode stored in the first memory 13a in step 3a, and checks in step 3b whether the stored mode is the automatic mode or analog only mode. Since the analog only mode is stored, the controller 12 shifts from step 3b to step 3c, and rewrites the mode stored in the first memory 13a from the analog only mode to the automatic mode. Then, the controller 12 executes procedures in step 3d and subsequent steps in accordance with the rewritten automatic mode. FIG. 5 is a table showing the transition state of the system selection mode in the first memory 13a.

As described above, the first embodiment newly adds the system selection mode resetting function to a mobile communication terminal apparatus having the automatic mode and the analog only mode lower in priority than the automatic mode. The mode stored in the first memory is checked prior to the start of system selection control upon power-on. When the mode stored in the first memory is the analog only mode, the mode stored in the first memory is rewritten to the automatic mode. After that, system selection control is executed.

Even if the user powers off the terminal apparatus with the system selection mode changed to the analog only mode, the mode stored in the first memory is automatically reset to the higher-priority automatic mode. System selection processing is executed in accordance with the reset automatic mode.

The terminal apparatus does not keep the lower-priority analog only mode. The problem that the battery 16 runs out faster than expected and the terminal apparatus fails to be used outside the user's home can be prevented. The user need not return the system selection mode to the automatic mode set before the change, improving the operability.

(Second Embodiment)

The second embodiment of a mobile communication terminal apparatus according to the present invention newly adds a system selection mode resetting function to a mobile communication terminal apparatus having an automatic mode (automatic system selection mode), a home only mode targeted to only a digital system designated in advance, and an analog only mode lower in priority than the automatic mode and home only mode.

The mode stored in the first memory is checked in response to power-on prior to the start of system selection control. If the mode stored in the first memory is the analog only mode, the automatic mode or home only mode which was stored in the first memory immediately before change operation to the analog only mode is read out from the second memory. The mode stored in the first memory is rewritten to the mode in the second memory.

Figure 6:
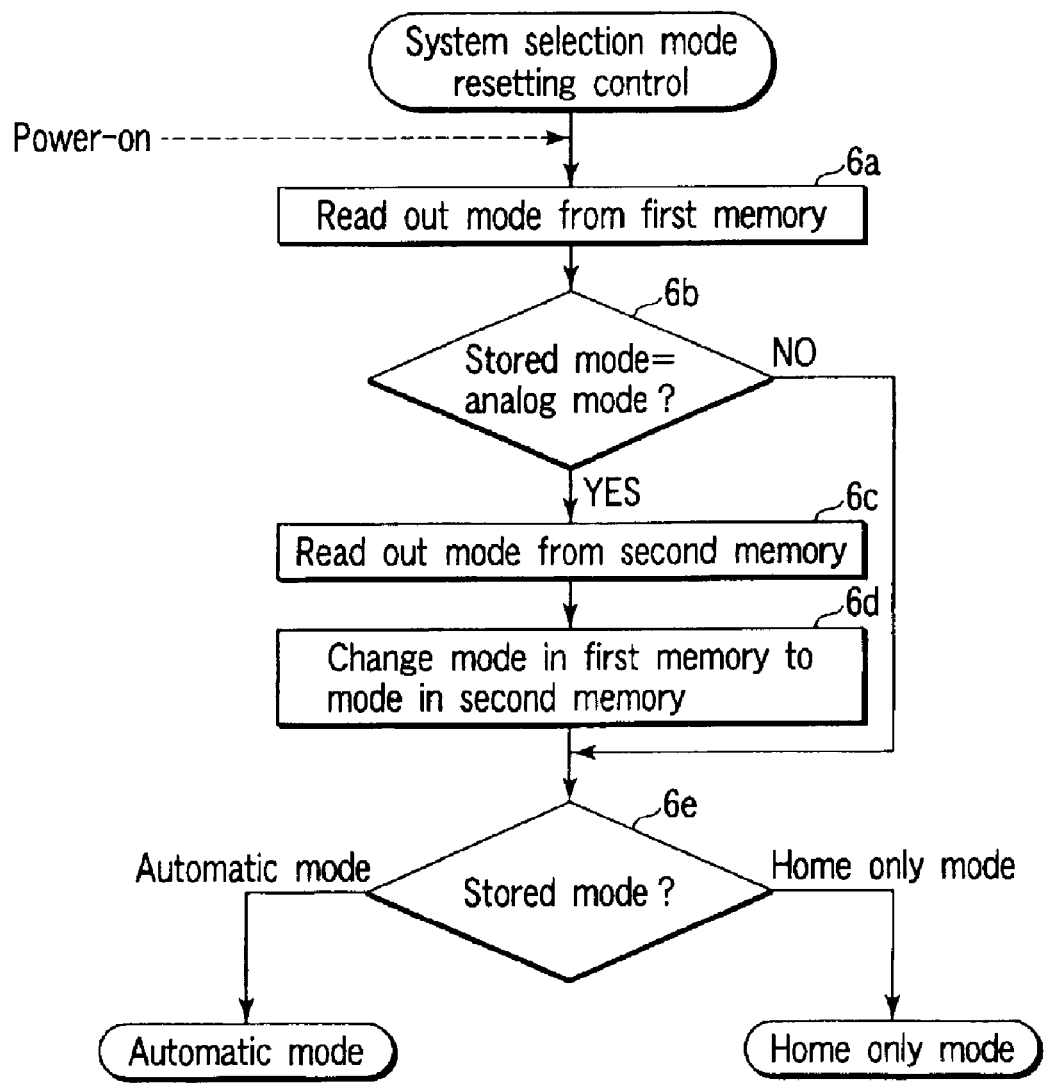
FIG. 6 is a flow chart showing the control procedures and control contents of system selection mode resetting control executed in a mobile communication terminal apparatus according to the second embodiment of the present invention.
Figure 7:
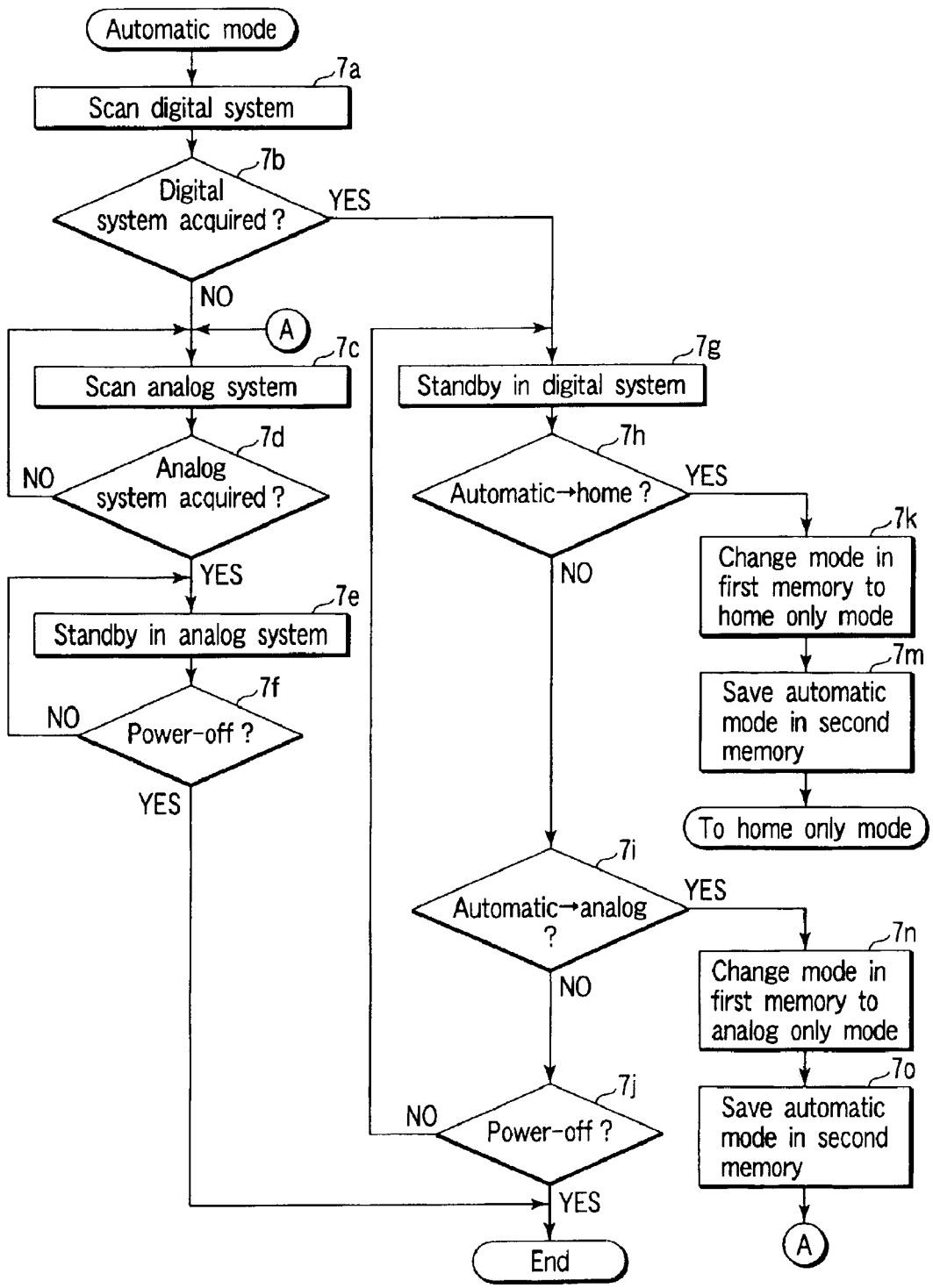
FIG. 7 is a flow chart showing the control procedures and control contents of system selection control in an automatic mode executed in the mobile communication terminal apparatus according to the second embodiment of the present invention.
Figure 8:
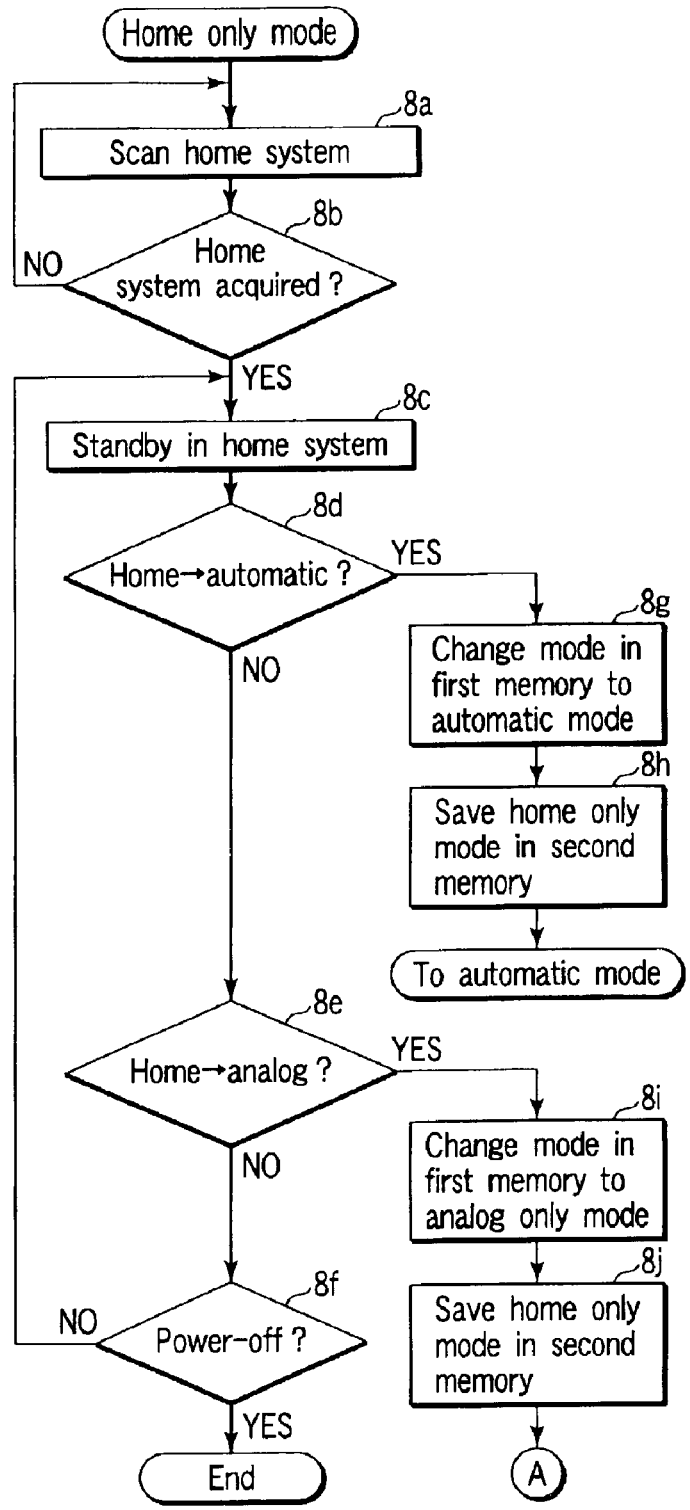
FIG. 8 is a flow chart showing the control procedures and control contents of system selection control in a home only mode executed in the mobile communication terminal apparatus according to the second embodiment of the present invention.

FIGS. 6 to 8 are flow charts showing the control procedures and control contents of system selection control by the mobile communication terminal apparatus according to the second embodiment. The circuit arrangement of the terminal apparatus is basically the same as that shown in FIG. 2, and a description thereof will be omitted.

If the user powers on the terminal apparatus, a controller 12 reads out the mode stored in a first memory 13a in step 6a, and checks in step 6b whether the stored mode is the analog only mode. If the mode stored in the first memory 13a is not the analog only mode, the controller 12 shifts to step 6e without rewriting the mode stored in the first memory 13a. The controller 12 then checks whether the mode stored in the first memory 13a is the automatic mode or home only mode, and shifts to system selection processing corresponding to each mode in accordance with the determination result.

System selection control in the automatic mode will be described first. FIG. 7 is a flow chart showing the control procedures and control contents.

In step 7a, the controller 12 scans pilot signals broadcast by digital systems in order of priority, and determines their reception qualities. If the controller 12 detects a pilot signal which satisfies a condition, the controller 12 shifts from step 7b to step 7g. The controller 12 establishes synchronization with the base station of the digital system which has transmitted the pilot signal, and shifts to the standby state.

If the controller 12 cannot acquire the base station of any digital system, the controller 12 shifts from step 7b to step 7c, and searches control signals broadcast by analog systems. If the controller 12 detects a control signal which satisfies the condition, the controller 12 shifts from step 7d to step 7e. The controller 12 acquires the base station of the analog system which has transmitted the detected control signal, and shifts to the standby state.

During standby operation for the base station of the analog system, the controller 12 monitors power-off in step 7f while monitoring an originating/terminating call or checking the necessity of handoff. If the user powers off the terminal apparatus, the controller 12 ends the control.

During standby operation with the base station of the digital system, the controller 12 monitors system selection mode change operation by the user in steps 7h and 7i while monitoring an originating/terminating call or checking the necessity of handoff. At the same time, the controller 12 monitors power-off in step 7j. If the user powers off the terminal apparatus, the controller 12 ends system selection control, similar to the case wherein the terminal apparatus is connected to the analog system.

Assume that the user desires connection to, e.g., a main-contracted system and performs operation of changing the system selection mode from the automatic mode to the home only mode. This change operation is done by invoking, e.g., a system selection menu shown in FIG. 9, and selecting and determining "2" corresponding to the home only mode in the menu.

If the home only mode is selected, the controller 12 rewrites the automatic mode stored in the first memory 13*a* to the home only mode in step 7*k*. In addition, the controller 12 saves the mode that has been stored in the first memory 13*a* immediately before rewrite, i.e., the automatic mode in the second memory incorporated in the controller 12. Thereafter, the controller 12 shifts to system selection control operation in the home only mode (to be described later).

Also, assume that the user desires connection to, e.g., an analog system and performs operation of changing the system selection mode from the automatic mode to the analog only mode during standby operation in connection to the digital system. This change operation is done by selecting and designating "1" corresponding to the analog only mode in the system selection menu shown in FIG. 9.

If the analog only mode is selected, the controller 12 rewrites the automatic mode stored in the first memory 13*a* to the analog only mode in step 7*n*. In addition, the controller 12 saves the mode that has been stored in the first memory 13*a* immediately before rewrite, i.e., the automatic mode in the second memory in step 7*o*.

After the end of rewrite processing in the first memory 13*a*, the controller 12 shifts to step 7*c*, and executes a series of procedures of searching control signals transmitted by the base stations of analog systems. If the controller 12 detects a control signal which satisfies a condition, the controller 12 acquires the base station of the analog system which has transmitted the detected control signal, and shifts to the standby state. This state is canceled after power-off.

Next, system selection control in the home only mode will be explained. FIG. 8 is a flow chart showing the control procedures and control contents.

In step 8*a*, the controller 12 searches pilot signals broadcast by the base stations of digital systems (to be referred to as home systems hereinafter) registered in home in advance. If the controller 12 detects a pilot signal which satisfies the predetermined condition, the controller 12 shifts from step 8*b* to step 8*c*. The controller 12 establishes synchronization with the base station of the home system which has transmitted the detected pilot signal, and shifts to the standby state.

During standby operation with the base station of the home system, the controller 12 monitors system selection mode change operation by the user in steps 8*d* and 8*e* while monitoring an originating/terminating call or checking the necessity of handoff. If the user powers off the terminal apparatus, the controller 12 ends the control.

Assume that the user desires connection to, e.g., a digital system higher in communication quality than the home system, and performs operation of changing the system selection mode from the home only mode to the automatic mode. This change operation is done by selecting and determining "0" corresponding to the automatic mode in the system selection menu shown in FIG. 9.

If the automatic mode is selected, the controller 12 rewrites the home only mode stored in the first memory 13*a* to the automatic mode in step 8*g*. At the same time, the controller 12 saves the mode that has been stored in the first memory 13*a* immediately before rewrite, i.e., the home only mode in the second memory incorporated in the controller 12. The controller 12 then shifts to system selection control operation in the automatic mode (to be described later).

Assume that the user desires connection to, e.g., an analog system and performs operation of changing the system selection mode from the home only mode to the analog only mode during standby operation in connection to the digital home system. This change operation is done by selecting and designating "1" corresponding to the analog only mode in the system selection menu shown in FIG. 9.

If the analog only mode is selected, the controller 12 rewrites the home only mode stored in the first memory to the analog only mode in step 8*i*. Further, the controller 12 saves the mode that has been stored in the first memory 13*a* immediately before rewrite, i.e., the home only mode in the second memory in step 8*j*.

After the end of rewrite processing in the first memory 13*a*, the controller 12 shifts to step 7*c*, and executes a series of procedures of acquiring the base station of an analog system. If the controller 12 acquires the base station of an analog system, the controller 12 shifts to the standby state. This state is canceled after power-off.

If the system selection mode is changed to the analog only mode, the mode stored in the first memory 13*a* is reset as follows.

If the terminal apparatus is powered on, the controller 12 reads out the mode stored in the first memory in step 6*a*, as shown in FIG. 6. In step 6*b*, the controller 12 checks whether the stored mode is the analog only mode. If the analog only mode has been stored, the controller 12 shifts from step 6*b* to step 6*c*, and reads out from the second memory the mode which was stored in the first memory 13*a* immediately before mode change. In step 6*d*, the controller 12 rewrites the mode stored in the first memory 13*a* to the mode saved in the second memory.

For example, the mode is rewritten to the automatic mode when the mode saved in the second memory is the automatic mode, or to the home only mode when the mode saved in the second memory is the home only mode.

After that, system selection control procedures are executed in accordance with the mode stored in the first memory 13*a* after rewrite, i.e., the automatic mode or home only mode. FIG. 10 is a table showing the transition state of the memory contents of the system selection mode stored in the first memory 13*a*.

As described above, according to the second embodiment, whether the mode stored in the first memory 13*a* is the analog only mode is checked prior to the start of system selection control upon power-on. When the analog only mode has been stored, the automatic mode or home only mode which was stored in the first memory 13*a* immediately before change operation to the analog only mode is read out from the second memory. The mode stored in the first memory 13*a* is rewritten to the mode in the second memory.

Even if the user powers off the terminal apparatus with the system selection mode changed to the analog only mode, the mode stored in the first memory 13*a* is automatically reset to the higher-priority mode. At this time, the mode is reset to the one which was stored in the first memory 13*a* immediately before change operation to the analog only mode. The mode immediately before change, i.e., the automatic mode or home only mode can be faithfully set again.

Hence, the terminal apparatus does not keep using the lower-priority analog only mode, similar to the first embodiment. The problem that the battery 16 runs out faster than expected and the terminal apparatus cannot be used outside the user's home can be prevented. The user need not return the system selection mode to the automatic mode or home only mode set before change, improving the operability.

(Other Embodiments)

In the first and second embodiments, system selection mode resetting processing is executed in response to power-on operation. Alternatively, system selection mode resetting processing may be executed in response to power-off operation, and the terminal apparatus may be powered off after the end of processing.

In the above embodiments, priorities are permanently set for the automatic mode and analog only mode, or the automatic mode, home only mode, and analog only mode. However, the present invention is not limited to this, and priority setting control procedures may be newly employed to arbitrarily set priority for each mode by user operation.

With this setting, a system which can reduce the power consumption of the terminal apparatus and maintain the connection completion ratio can be selected when the automatic mode is assigned the highest priority. If the home only mode is assigned the highest priority, a system which minimizes the cost can be selected. If the analog only mode is assigned the highest priority, a system which puts importance on the connection completion ratio can be selected.

The type and number of systems to be selected, the type of system selection mode for selecting these systems, the type of radio access scheme, the circuit arrangement of a corresponding terminal apparatus, the procedures and processing contents of system selection control, the procedures and processing contents of the system selection mode resetting control means, and the like can also be variously modified without departing from the spirit and scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication terminal apparatus which can be selectively connected to a plurality of mobile communication systems and includes a plurality of system selection modes assigned priorities in advance, comprising:

a first memory configured to store one of the plurality of system selection modes;

first mode change means for, when a user of the apparatus performs system selection mode change operation in a standby state, changing the mode stored in said first memory to a system selection mode selected by the change operation;

first control means for executing processing of changing a mobile communication system at a connection destination in accordance with the system selection mode changed by said first mode change means;

determination means for determining a priority assigned to the system selection mode stored in said first memory in response to power-on;

second mode change means for changing the system selection mode stored in said first memory to a system selection mode higher in priority than the mode on the basis of a determination result of said determination means; and second control means for acquiring the mobile communication system at the connection destination in accordance with the system selection mode changed by said second mode change means in response to power-on, and shifting to the standby state.

2. An apparatus according to claim 1, in which the plurality of system selection modes include a first mode of selecting a connectable system from a digital system and an analog system, and a second mode of selecting only an analog system, and the first mode is assigned a higher priority than the second mode, wherein said determination means determines in response to power-on whether the system selection mode stored in said first memory is the first mode or the second mode, and said second mode change means changes the mode stored in said first memory to the first mode when the system selection mode stored in said first memory is the second mode.

3. An apparatus according to claim 1, in which the plurality of system selection modes include a first mode of selecting a connectable system from a digital system and an analog system, a second mode of selecting only an analog system, and a third mode of selecting only a predetermined system from a plurality of digital systems, and the first and third modes are assigned higher priorities than the second mode, wherein said first mode change means comprises a second memory configured to, when the user of the apparatus performs system selection mode change operation, save the system selection mode which has been stored in said first memory immediately before the change operation, said determination means determines in response to power-on whether the system selection mode stored in said first memory is the second mode or another mode, and said second mode change means changes the system selection mode stored in said first memory to either one of the first and third modes saved in said second memory when the system selection mode stored in said first memory is the second mode.

4. A mobile communication terminal apparatus which can be selectively connected to a plurality of mobile communication systems and has a plurality of system selection modes assigned priorities in advance, comprising:

a first memory configured to store one of the plurality of system selection modes;

first mode change means for, when a user of the apparatus performs system selection mode change operation in a standby state, changing the mode stored in said first memory to a system selection mode selected by the change operation;

first control means for executing processing of changing a mobile communication system at a connection destination in accordance with the system selection mode changed by said first mode change means;

determination means for determining a priority assigned to the system selection mode stored in said first memory in response to power-off;

second mode change means for changing the system selection mode stored in said first memory to a system selection mode higher in priority than the mode on the basis of a determination result of said determination means; and second control means for acquiring the mobile communication system at the connection destination in accordance with the system selection mode changed by said second mode change means in response to power-on, and shifting to the standby state.

5. An apparatus according to claim 4, in which the plurality of system selection modes include a first mode of selecting a connectable system from a digital system and an analog system, and a second mode of selecting only an analog system, and the first mode is assigned a higher priority than the second mode, wherein said determination means determines in response to power-off whether the system selection mode stored in said first memory is the first mode or the second mode, and said second mode change means changes the system selection mode stored in said first memory to the first mode when the system selection mode stored in said first memory is the second mode.

6. An apparatus according to claim 4, in which the plurality of system selection modes include a first mode of selecting a connectable system from a digital system and an analog system, a second mode of selecting only an analog system, and a third mode of selecting only a predetermined system from a plurality of digital systems, and the first and third modes are assigned higher priorities than the second mode, wherein said first mode change means comprises a second memory configured to, when the user of the apparatus performs system selection mode change operation, save the system selection mode which has been stored before the change operation, said determination means determines in response to power-off whether the system selection mode stored in said first memory is the second mode or another mode, and said second mode change means changes the system selection mode stored in said first memory to either one of the first and third modes saved in said second memory when the system selection mode stored in said first memory is the second mode.

* * * * *